US012503416B2

(12) United States Patent
Frassetto et al.

(10) Patent No.: US 12,503,416 B2
(45) Date of Patent: Dec. 23, 2025

(54) PROCESS FOR THE PREPARATION OF α-ALKYL-2-(TRIFLUOROMETHYL)-BENZYL ALCOHOLS

(71) Applicant: BASF SE, Ludwigshafen (DE)

(72) Inventors: Timo Frassetto, Ludwigshafen (DE); Christiane Alznauer, Ludwigshafen (DE); Florian Vogt, Ludwigshafen (DE); Harish Shinde, Navi Mumbai (IN); Daniel Saelinger, Ludwigshafen (DE); Heinz Friedrich Sutoris, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 447 days.

(21) Appl. No.: 18/030,609

(22) PCT Filed: Oct. 4, 2021

(86) PCT No.: PCT/EP2021/077255
§ 371 (c)(1),
(2) Date: Apr. 6, 2023

(87) PCT Pub. No.: WO2022/078796
PCT Pub. Date: Apr. 21, 2022

(65) Prior Publication Data
US 2023/0382831 A1 Nov. 30, 2023

(30) Foreign Application Priority Data
Oct. 12, 2020 (EP) .................................... 20201212

(51) Int. Cl.
C07C 29/40 (2006.01)
(52) U.S. Cl.
CPC .................................. C07C 29/40 (2013.01)
(58) Field of Classification Search
CPC ..................................................... C07C 29/40
See application file for complete search history.

(56) References Cited

U.S. PATENT DOCUMENTS 10,112,899 B2   10/2018   Johns et al.
2009/0264680 A1  10/2009  Castellin et al.

FOREIGN PATENT DOCUMENTS

| CN | 101061087 A | 10/2007 |
| CN | 105061177 A | 11/2015 |
| CN | 105461538 A | 4/2016 |
| CN | 106795141 A | 5/2017 |
| WO | WO-2004/094353 A1 | 11/2004 |

OTHER PUBLICATIONS

Danielle, et al., "Choix des methodes pour la synthese univoque de carbures acetyleniques. Troisieme partie : Arylacetylenes et aryl-1 alcynes-1", Journal of Chemical Research—Synopses Science Reviews, Issue 9, 1981, pp. 3216-3245.
European Search Report for EP Patent Application No. 20201212.6, Issued on Apr. 14, 2021, 3 pages.
Kobayashi, et al., "Grignard Reactions in Cyclopentyl Methyl Ether", Asian Journal of Organic Chemistry, vol. 5, Issue 5, Mar. 7, 2016, pp. 636-645.
International Search Report and Written Opinion for PCT Patent Application No. PCT/EP2021/077255, Issued on Dec. 6, 2021, 4 pages.
Krasovskiy, et al., "A LiCI?mediated Br/Mg exchange reaction for the preparation of functionalized aryl?and heteroarylmagnesium compounds from organic bromides", Angewandte Chemie International Edition, vol. 43, Issue 25, Jun. 15, 2004, pp. 3333-3336.
Krasovskiy, et al., "Highly efficient reagents for Br/Mg exchange", Angewandte Chemie International Edition, vol. 45, Issue 1, Dec. 14, 2005, pp. 159-162.
Orchin, "The Grignard Reagent: Preparation, Structure, and Some Reactions", Journal of Chemical Education, vol. 66, Issue 7, Jul. 1, 1989, pp. 586-588.
Teng, et al., "Synthesis and characterization of trifluoromethyl substituted styrene polymers and copolymers with methacrylates: Effects of trifluoromethyl substituent on styrene", Polymer, vol. 52, Issue 4, Feb. 17, 2011, pp. 949-953.
Tilstam, et al., "Activation of Mg metal for safe formation of Grignard reagents on plant scale", Organic process research & development, vol. 6, Issue 6, Oct. 24, 2002, pp. 906-910.

*Primary Examiner* — Sikarl A Witherspoon
(74) *Attorney, Agent, or Firm* — MARSHALL, GERSTEIN & BORUN LLP

(57) ABSTRACT

The present invention relates to a process for the preparation of preparation α-alkyl-2-(trifluoromethyl)-benzyl alcohol.

14 Claims, No Drawings

PROCESS FOR THE PREPARATION OF α-ALKYL-2-(TRIFLUOROMETHYL)-BENZYL ALCOHOLS

CROSS-REFERENCE TO RELATED APPLICATIONS

This is the U.S. national phase of International Application No. PCT/EP2021/077255, filed Oct. 4, 2021, which claims the benefit of European Patent Application No. 20201212.6, filed on Oct. 12, 2020.

The present invention relates to a process for the preparation α-alkyl-2-(trifluoromethyl)-benzyl alcohols.

α-alkyl-2-(trifluoromethyl)-benzyl alcohols (I) are valuable substrates for the synthesis of pesticidally active compounds. Therefore, there is a need for processes that easily make them available.

One of the ways for preparing α-alkyl-2-(trifluoromethyl)-benzyl alcohols is reaction of 2-(trifluoromethyl)-phenyl halides with a Grignard reagent and a respective aldehyde. Such reactions are described, for example, in Journal of Chemical Research, Synopses (1981), (9), 3216-3245

The reaction is usually carried out in an ether solvent or in a mixture of an ether solvent and a water immiscible solvent, like toluene or xylene. After completion of the reaction, water or an acidic aqueous solution is usually added to the reaction mixture and the product is extracted with a water-immiscible organic solvent. Finally, the solvents are removed by evaporation. On an industrial scale, it is usually required to recover and re-use the solvents. However, since the solvents were brought in contact with water, it is difficult to recover the dry solvents and an extra-drying step is often required. Moreover, the phase separation during the extraction step is sometimes problematic. Additionally, the ether solvent and the water-immiscible solvent have to be separated. Furthermore, working with organic Grignard compounds bearing a trifluoromethyl group in the presence of solid Mg is not safe and the presence of Mg excess is to be avoided.

Therefore, it was an object of the present invention to develop a process for the preparation of α-alkyl-2-(trifluoromethyl)-benzyl alcohols (I), which method enables simple and cheap recovery of the used solvents and leads to the desired product in high yields, hence being suitable for an upscale to industrially relevant amounts.

It has surprisingly been found a highly efficient and safe process for preparation of α-alkyl-2-(trifluoromethyl)-benzyl alcohols (I) in high yields, which process allows to recover dry solvents.

Accordingly, the present invention relates to a process for the preparation of the compound of formula (I)

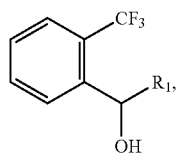
(I)

comprising the following steps:
(i) reacting a compound of formula (A)

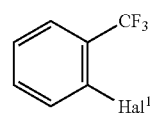
(A)

with R'—Mg-Hal$^2$ (B1) or Mg (B2) and R$^1$C(=O)H (C)
in the presence of an ether solvent
wherein the compound (A) is used in an amount of 2.4 to 20 mole per 1 mole of R'—Mg-Hal$^2$ or Mg and wherein at least 1 mole of the whole amount of compound (A) is added during the reaction and the remaining amount of compound (A) is added either during the reaction or after the completion of the reaction;
(ii) removing the ether solvent from the reaction mixture wherein the variables are defined as follows:
R$^1$ is $C_1$-$C_4$-Alkyl;
R' is $C_1$-$C_4$-Alkyl or $C_3$-$C_6$-Cycloalkyl;
Hal$^1$ is Cl or Br;
Hal$^2$ is Cl or Br.

The compound of formula (I) is also part of the present invention.

The process according to the present invention entails a series of advantages. It is cheap and leads to the product in high yields. The use of the compound (A) as a co-solvent prevents the presence of solid Mg particles in the reaction mixture and allows removing the dry ether solvent from the reaction mixture before it was brought in contact with water. Hence, the reaction is safe and no drying step for the ether solvent is needed. After removing the ether-solvent, the product remains dissolved or dispersed suspended in the compound (A). The compound (A) is water immiscible. After adding water or an aqueous acidic solution a clear phase separation occurs. Therefore, an addition of a further water immiscible solvent can be avoided. Any of these advantages saves resources and energy and makes the process industrially simple and environmentally friendly.

Further embodiments of the invention are evident from the claims, the description and the examples. It is to be understood that the single features of the subject matter of the invention described herein can be applied not only in the combination given in each particular case but also in other combinations, without leaving the scope of the invention.

Starting compound (A) is commercially available or can be synthesized as known to the skilled person. In the compound (A)

Hal$^1$ is Cl or Br. According to one embodiment Hal$^1$ is Cl. According to another embodiment Hal$^1$ is Br.

According the process of the present invention compound (I) is prepared. In compound (I)

R$^1$ is $C_1$-$C_4$-Alkyl, such as $CH_3$, $C_2H_5$, $C_3H_7$, $CH(CH_3)_2$, $C_4H_9$, $CH_2CH(CH_3)_2$, $C(CH_3)_3$; preferably, $C_1$-$C_2$-Alkyl, such as $CH_3$, $C_2H_5$; most preferably $CH_3$.

The compound (A) is reacted with the Grignard reagent R'-Mg-Hal$^2$ (B1) or Mg (B2) and then with the carbonyl compound R$^1$C(=O)H (C).

According one embodiment, the Grignard reagent R'-Mg-Hal$^2$ (B1) is used in the process. In the Grignard reagent R' is $C_1$-$C_4$-alkyl or $C_3$-$C_6$-cycloalkyl, such as $CH_3$, $C_2H_5$, $C_3H_7$, $CH(CH_3)_2$, $C_4H_9$, $CH_2CH(CH_3)_2$, $C(CH_3)_3$ or cyclopropyl. In one specific embodiment, R' is ethyl. In another specific embodiment, R' is isopropyl. In one further specific embodiment, R' is sec-butyl;

$Hal^2$ is Cl or Br. In one specific embodiment, $Hal^2$ is Cl. In another specific embodiment, $Hal^2$ is Br.

According to one embodiment, in the Grignard reagent $Hal^2$ is Cl and R' is selected from $C_2H_5$, $CH(CH_3)_2$, $CH_2CH(CH_3)_2$, $C(CH_3)_3$ and cyclopropyl. According to a further embodiment, $Hal^2$ is Br and R' is selected from $C_2H_5$, $CH(CH_3)_2$, $CH_2CH(CH_3)_2$, $C(CH_3)_3$ and cyclopropyl. In one specific embodiment, the Grignard reagent is Et-Mg—Cl or Et-Mg—Br. In another specific embodiment, the Grignard reagent is (iso-propyl)-Mg—Cl or (iso-propyl)-Mg—Br. In one further specific embodiment, the Grignard reagent is (sec-butyl)-Mg—Cl or (sec-butyl)-Mg—Br.

One further embodiment relates to the process, wherein Mg (B2) is used then forming a Grignard reagent with compound (A).

The compound (A) is used in an amount of 2.4 to 20 mol, preferably 2.5 to 15 mol, more preferably 3 to 10 mol, in relation to one mol of the Grignard reagent R'-Mg-$Hal^2$ (B1) or Mg (B2). At least 1 mole, preferably at least 1.2 mole, more preferably 1.5 mole, most preferably at least 2 mole of the whole amount of compound (A) is added during the reaction and the remaining amount of compound (A) is added either during the reaction with $R^1C(=O)H$ (C) or after the completion of the reaction.

According to one embodiment, the whole amount of compound (A) is added during the reaction.

According to another embodiment, at least 1 mole, preferably at least 1.2 mole, more preferably at least 1.5 mole, most preferably at least 2 mole of the whole amount of compound (A) is added during the reaction and the remaining amount of compound (A) is added after the completion of the reaction.

According to a specific embodiment 1 mole to 10 mole, preferably 1.2 mole to 7 mole, more preferably 1.5 mole to 5 mole, most preferably 1.5 mole to 3 mole, of the whole amount of compound (A) is added during the reaction and the remaining amount of compound (A) is added after the completion of the reaction.

When the remaining amount of compound (A) is added after the completion of the reaction, it can be added before the step (ii) or during the step (ii). According to one embodiment, it is added before the step (ii). According to another embodiment, it is added during the step (ii).

According to a specific embodiment of the inventive process, LiCl can be added to the reaction mixture of step (i). According to an alternative, before contacting the Grignard reagent (B1) with compounds (A) and (C), it is brought together with LiCl, thereby forming an addition product R'MgHal²·LiCl ((B1)·LiCl). According to this alternative, ((B1)·LiCl) is then used in step (i). The use of LiCl together with Grignard reagents is generally known in the art, see for example Angew. Chem. Int. Ed. 2004, 43, 3333 and Angew. Chem. Int. Ed. 2006, 45, 159.

The Grignard reagents (B1) or their addition products with LiCl ((B1)·LiCl) are commercially available or can be made according to processes well-known to the skilled person (see Angew. Chem. Int. Ed. 2004, 43, 3333).

According to a further specific embodiment of the inventive process, Mg surface is activated by using methods or agents known in the art, for example, alkyl bromides, such as 2-bromopropan. For further examples see, e.g. Asian J. Org. Chem, 2016, 5, 636-45, Org. Proc. Res & Dev. 2002, 906-910.

As generally known to the skilled person, the structure of a Grignard reagent can be described by the so-called Schlenck equilibrium. A Grignard reagent undergoes a solvent-dependent equilibrium between different magnesium compounds. The Schlenck equilibrium for the Grignard reagent used according to the present invention can be schematically illustrated as follows:

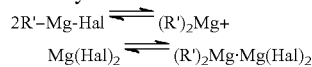

Furthermore, it is known, that solvent molecules, in particular ethers such as diethylether or THF, which are commonly used for reactions with Grignard reagents, can add to the magnesium of the Grignard reagent thereby forming etherates. For general information regarding structures of Grignard reagents, see also Milton Orchin, Journal of Chemical Education, Volume 66, Number 7, 1999, pp 586 to 588.

The reaction of compound (A) with Grignard reagent R'—Mg-$Hal^2$ (B1) or Mg (B2) may lead to the intermediate Grignard compounds (G1) and/or (G2). Hence, the compounds (G1) and (G2) are also part of the present invention. Depending on the Grignard reagent used, (G1) or (G2) may occur alone or (G1) and (G2) may be formed both.

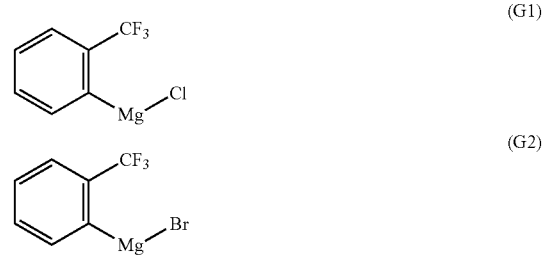

Said compounds may include solvent molecules such as THF (tetrahydrofuran). It is apparent to the skilled person that also other solvent molecules may be present, depending on the solvent used in the reaction. These addition products with solvent molecules are also encompassed by the present invention.

$R^1$ in the carbonyl compound $R^1C(=O)H$ (C) is defined as for compound (I).

According to one specific embodiment, $R^1$ is $CH_3$.

The carbonyl compound $R^1C(=O)H$ (C) is preferably used in an equimolar amount or in excess as compared to the Grignard reagent R'—Mg-$Hal^2$ (B1) or Mg (B2). Specifically, the carbonyl compound is used in an amount of 1 to 3 mol, preferably 1 to 2.5 mole, more preferably 1 to 2 mol, in relation to one mole of R'—Mg-$Hal^2$ (B1) or Mg (B2). In particular the amounts of 1 to 1.5 mole, more specifically 1.05 to 1.1 mole per mole of R'—Mg-$Hal^2$ (B1) or Mg (B2) may be favorable according to the present invention.

The reaction of step (i) is carried out in the presence of an ether solvent, such as tetrahydrofuran (THF), 1,4-dioxane, diethyl ether, 2-methyl-tetrahydrofuran or methyl-tert-butylether (MTBE), preferably THF or diethyl ether, most preferably THF.

The Grignard reagent is added in the manner as is common to the skilled person. In particular, it can be added as solution in an ether solvent as mentioned above, i.e. as a solution in tetrahydrofuran (THF), 1,4-dioxane, diethyl ether, 2-methyl-tetrahydrofuran or methyl-tert-butylether (MTBE), preferably THF or diethyl ether, most preferably THF.

The order of adding reagents to the reaction mixture is variable.

According to one embodiment, compound (A) and compound (B1) or (B2) are added to the reaction mixture, followed by the addition of compound (C). Compounds (A) and (B1) or (B2) can be added simultaneously (in parallel) or in succession. According to one specific embodiment they are added in parallel. According to another specific embodiment, they are added in succession. In this case, the order of adding is also variable. Either compound (A) or compound (B1) or (B2) can be added at first.

According to another embodiment, compound (B1) or (B2) is added to the reaction mixture followed by addition of compound (A) and compound (C). Compounds (A) and (C) can be added simultaneously (in parallel or as a mixture) or in succession. According to one specific embodiment they are added in parallel. According to another specific embodiment, they are added in succession. In this case, first compound (A) and then compound (C) are added. According to another specific embodiment, a mixture of compounds (A) and (C) is added to the reaction mixture.

The reagents can be added in one portion or gradually, e.g. dropwise or in several portions. According to one embodiment, the addition is made in one portion. According to another embodiment the addition is made gradually, e.g. dropwise or in several portions.

In the further course of reaction step (i), the temperature is preferably held at a maximum of more preferably at a maximum of 50° C., most preferably at a maximum of 45° C., particularly preferable at maximum of 35° C. Generally, it is preferred to have a reaction temperature of 0° C. to 65° C., in particular 10° C. to 50° C., especially 20° C. to 40° C. In a further embodiment, the temperature is 25° C. to 35° C.

The step (i) according to the present invention can be carried out batchwise or continuously. According to one embodiment, it is carried out batchwise. According to another embodiment, it is carried out continuously.

In the step (ii) the solvents are removed from the reaction mixture. This is done as known to a person skilled in the art, e.g. by evaporation.

After step (ii), a work-up of the reaction mixture can be carried out by procedures known in a general manner to the person skilled in the art. Usually, after completion of the reaction, water or an aqueous acidic solution, e.g. aqueous HCl, is added and the organic phase is washed with water, then the solvent is removed from the separated organic phases. The raw product can be further worked up and/or purified as generally known to the skilled person.

The invention is illustrated by the following examples without being limited thereto or thereby.

EXPERIMENTAL PART

HPLC-method: Agilent 1290; column: Chromolith RP 18e 50×4,6 mm; mobile phase A: acetonitrile, mobile phase B: $H_2O$+0.5% 0.5 mol/L $H_2SO_4$; flow 1.75 mL/min; gradient: 0 min 45% A—1.5 min 45% A—3.9 min 70% A—4.0 min 45% A; temperature 40° C., wavelength 254 nm Product is at 0.78 min

Example 1: Preparation of α-methyl-2-(trifluoromethyl)-benzyl Alcohol 12.2 g (0.50 mol) Mg-turnings are placed in a vessel and 4.3 g (0.10 mol) solid lithium chloride is added. 100 g THF is added. 2.0 g (15 mmol) 2-bromopropane is added to activate the magnesium. A rise of the internal temperature shows the start of the Grignard reaction. 15 min after initiation, the mixture is cooled to 30° C. A solution of 2-chlorobenzotrifluoride (CBTF) (183 g, 1.0 mol) in THF (390 g) is dosed into the suspension within 4 h. The mixture is post-stirred at 30° C. for 1 h. The mixture is cooled to 0° C. and a solution of 32.0 g (0.73 mol) acetaldehyde in 32 g THF is pumped sub-surface into the reaction mixture at a rate that allows to maintain the temperature below 10° C. The mixture is post-stirred for 15 min. THF is removed under reduced pressure while 183 g CBTF (1.0 mol) is added to dilute the mixture. Hydrochloric acid (2.0 M, 315 g, 0.60 mol) is placed in a second vessel and the hot distillation residue is transferred into the HCl, keeping the temperature <50° C. The mixture is stirred for 30 min and the aqueous phase is discarded. The CBTF-phase containing the product is washed with 200 g water.

Yield: 272 g CBTF-phase, concentration of compound (I) is 30.1 wt % by HPLC, corresponding to 0.43 mol=86% based on magnesium.

Example 2: Preparation of α-methyl-2-(trifluoromethyl)-benzyl Alcohol 12.2 g (0.50 mol) Mg-turnings are placed in a vessel and 4.3 g (0.10 mol) solid lithium chloride is added. 100 g THF is added. 2.0 g (16 mmol) 2-bromopropane is added to activate the magnesium. A rise of the internal temperature shows the start of the Grignard reaction. 15 min after initiation, the mixture is cooled to 27° C. A solution of 2-chlorobenzotrifluoride (CBTF, 183 g, 1.0 mol) in THF (360 g) is prepared and dosing of this solution is started with a rate of 120 g/h, keeping the temperature below 38° C. by external cooling. After 90 min of dosage, 17.8 g acetaldehyde (0.40 mol) is mixed into the remaining CBTF-solution and its temperature is cooled to 10° C. to avoid acetaldehyde evaporation. The dosage is continued with 60 g/h. After 6.5 h, the remaining CBTF/acetaldehyde mixture is pumped into the reaction vessel. The mixture is post-stirred at 30° C. for 30 min. The mixture is cooled to 15° C. and a solution of 13.2 g (0.3 mol) acetaldehyde in 15 g THF is pumped into the reaction mixture at a rate that allows to maintain the temperature at maximum 23° C. The mixture is post-stirred for 15 min. THF is removed under reduced pressure while 183 g CBTF (1.0 mol) is added to dilute the mixture. Hydrochloric acid (2.0 M, 315 g, 0.60 mol) is added, keeping the temperature <50° C. The mixture is stirred for 30 min and the aqueous phase is discarded. The CBTF-phase containing the product is washed with 200 g water.

Yield: 264 g CBTF-phase, product concentration 30.0 wt % by HPLC, corresponding to 0.42 mol=83% based on magnesium.

$^1$H-NMR: (400 MHz, CDCl$_3$, mixture with CBTF): 7.82 (d, 1H, J=8.0 Hz), 7.57 (d, 1H, J=7.3 Hz), 7.54 (t, 1H, J=7.0 Hz), 7.28-7.35 (m, 1H, overlay with CBTF signals), 5.30 (q, 1H, J=6.5 Hz), 3.08 (br, 1H), 1.45 (d, 3H, J=6.3 Hz).

The invention claimed is:
1. A process for the preparation of a compound of formula (I)

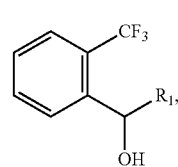

comprising:
(i) reacting a compound of formula (A)

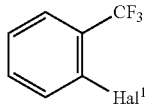

(A)

with R'—Mg-Hal² (B1) or Mg (B2) and R¹C(=O)H (C) in the presence of an ether solvent
wherein the compound (A) is used in an amount of 2.4 to 20 mole per 1 mole of R'—Mg-Hal² or Mg and wherein at least 1 mole of the whole amount of compound (A) is added during the reaction and the remaining amount of compound (A) is added either during the reaction or after the completion of the reaction; and
(ii) removing the ether solvent from the reaction mixture
wherein the variables are defined as follows:
$R^1$ is $C_1$-$C_4$-Alkyl;
R' is $C_1$-$C_4$-Alkyl or $C_3$-$C_6$-Cycloalkyl;
$Hal^1$ is Cl or Br;
$Hal^2$ is Cl or Br.

2. The process of claim 1, wherein the whole amount of compound A is added during the reaction.

3. The process of claim 1, wherein at least 1.2 mole of the whole amount of compound (A) is added during the reaction and the remaining amount of compound (A) is added after the completion of the reaction.

4. The process of claim 1, wherein the ether solvent is selected from the group consisting of tetrahydrofuran (THF), 1,4-dioxane, diethyl ether, 2-methyl-tetrahydrofuran, and methyl-tert-butylether (MTBE).

5. The process of claim 1, wherein the ether solvent is THF.

6. The process of claim 1, wherein $R^1$ is $CH_3$.

7. The process of claim 1, wherein R' is $C_2H_5$ or $CH(CH_3)_2$.

8. The process of claim 1, wherein the reaction is carried out with R'—Mg-Hal² (B1).

9. The process of claim 1, wherein two different R'—Mg-Hal² (B1) are used.

10. The process of claim 1, wherein the reaction is carried out with Mg (B2).

11. The process of claim 1, wherein the compound (C) is acetaldehyde.

12. The process of claim 1, wherein LiCl is added to the reaction.

13. The process of claim 1, wherein compound (A) and compound (B1) or (B2) are added simultaneously.

14. The process of claim 1, wherein compound (A) and compound (C) are added simultaneously.

* * * * *